US008305261B2

(12) United States Patent
Hunter

(10) Patent No.: US 8,305,261 B2
(45) Date of Patent: Nov. 6, 2012

(54) ADAPTIVE MAINLOBE CLUTTER METHOD FOR RANGE-DOPPLER MAPS

(75) Inventor: Kyle P. Hunter, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 355 days.

(21) Appl. No.: 12/753,335

(22) Filed: Apr. 2, 2010

(65) Prior Publication Data

US 2012/0139777 A1 Jun. 7, 2012

(51) Int. Cl.
*G01S 13/50* (2006.01)
(52) U.S. Cl. ......... 342/175; 342/195; 342/159; 342/162
(58) Field of Classification Search ............... 342/175, 342/195, 159–162
See application file for complete search history.

(56) References Cited

U.S. PATENT DOCUMENTS

| 3,346,859 A | | 10/1967 | Mullins et al. | |
|---|---|---|---|---|
| H1181 H | * | 5/1993 | Rihaczek | 342/25 F |
| 5,416,488 A | * | 5/1995 | Grover et al. | 342/159 |
| 5,510,796 A | * | 4/1996 | Applebaum | 342/162 |
| 5,539,412 A | * | 7/1996 | Mendelson | 342/192 |
| 5,568,151 A | * | 10/1996 | Merritt | 342/192 |
| 6,225,943 B1 | * | 5/2001 | Curley et al. | 342/137 |
| 6,366,236 B1 | * | 4/2002 | Farmer et al. | 342/195 |
| 6,747,593 B1 | * | 6/2004 | Jaffer | 342/160 |
| 7,193,558 B1 | * | 3/2007 | Gerlach et al. | 342/195 |
| 7,218,274 B2 | * | 5/2007 | Arikan et al. | 342/195 |
| 7,876,262 B2 | * | 1/2011 | Greendale et al. | 342/101 |
| 8,223,067 B2 | * | 7/2012 | Moulton et al. | 342/159 |
| 2005/0012657 A1 | * | 1/2005 | Mohan | 342/133 |
| 2007/0188377 A1 | * | 8/2007 | Krikorian et al. | 342/160 |
| 2010/0073218 A1 | * | 3/2010 | Stockmann | 342/146 |
| 2010/0245157 A1 | * | 9/2010 | Wicks et al. | 342/162 |
| 2011/0001657 A1 | * | 1/2011 | Fox et al. | 342/107 |
| 2011/0241931 A1 | * | 10/2011 | Krich et al. | 342/159 |
| 2012/0139777 A1 | * | 6/2012 | Hunter | 342/175 |

OTHER PUBLICATIONS

Lu, X.; Kirlin, R.L.; Wang, J.; , "Temporal impulsive noise excision in the range-Doppler map of HF radar," Image Processing, 2003. ICIP 2003. Proceedings. 2003 International Conference on , vol. 2, No., pp. II-835-8 vol. 3, Sep. 14-17, 2003.*
Alabaster, C.M.; Hughes, E.J.; , "Clutter Mapping for Airborne Pulse Doppler Radar," Radar Clutter Modelling, 2008 IET Seminar on , vol., No., pp. 49-55, Feb. 19-19, 2008.*
Yang Li; Ning Zhang; Qiang Yang; , "Spread E, F layer ionospheric clutter identification in range-Doppler map for HFSWR," Image Processing (ICIP), 2010 17th IEEE International Conference on , vol., No., pp. 1397-1400, Sep. 26-29, 2010.*

* cited by examiner

*Primary Examiner* — John B Sotomayor
(74) *Attorney, Agent, or Firm* — Renner, Otto, Boisselle & Sklar, LLP

(57) ABSTRACT

A method of adaptively removing mainlobe clutter from range-Doppler data includes estimating the peak of the mainlobe clutter, and determining clutter region boundaries adaptively and robustly. The mainlobe clutter peak may be estimated from the range-Doppler data, for example using both nonlinear and linear filters. Alternatively the mainlobe clutter peak may be estimated from knowledge of the position and speed of the vehicle, such as a missile, upon which the radar system moves. The clutter boundaries may be determined at each of the range bins by stepping along Doppler bins from the mainlobe clutter peak estimate in opposite directions, locating the boundary at locations off of the mainlobe clutter peak estimate that meet a given criterion. The method produces a finer determination of the mainlobe clutter region, resulting in less of the range-Doppler data being excluded as part of the mainlobe clutter region.

17 Claims, 8 Drawing Sheets

ADAPTIVE MAINLOBE CLUTTER METHOD FOR RANGE-DOPPLER MAPS

GOVERNMENT RIGHTS

This invention was made with United States Government support under Contract Number W31P4Q-04-C-R192 with the Department of the Army. The United States Government has certain rights in this invention.

BACKGROUND OF THE INVENTION

1. Field of the Invention

The invention is broadly in the field of treatment of radar data for radar systems on moving platforms.

2. Description of the Related Art

When a coherent radar system is mounted on a moving platform, and the platform is moving at some velocity toward stationary reflectors the phase of the coherent echo return advances 180 degrees for each ¼ wavelength of motion toward the object. Such motion produces the well-known Doppler frequency increase. If the motion is at high speed, then many wavelengths are traversed over a short time. Search radars, while scanning terrain, contain a mainlobe beam which strikes the terrain at varying angles with respect to the ground track or line of sight. Because of such varying angle and terrain configuration, and motion of the platform, mainlobe clutter, return signals from the ground and other stationary objects, gives the appearance of moving target-like objects in the field of view of the radar. Some mitigation is required to account for the mainlobe clutter, in order to avoid the return signals from the mainlobe clutter being treated as signals from moving targets.

One prior way of handling mainlobe clutter is to process the signal to make the received return signal from fixed objects appear stationary relative to the moving platform receiver itself. Multiple examples of types of such compensation for mainlobe clutter Doppler return due to radar platform motions are described in U.S. Pat. No. 3,346,859. A drawback of such compensation methods is the large of amount of computer processing power required.

It will be appreciated from the foregoing that improvements would be desirable with regard to handling mainlobe clutter in radar systems on moving platforms.

SUMMARY OF THE INVENTION

According to an aspect of the invention, a method of processing reflected radar signals includes the steps of: creating a range-Doppler map from the reflected signals; making a mainlobe clutter ridge estimation from the range-Doppler map; and separately determining boundaries of a mainlobe clutter region around the mainlobe clutter ridge estimation, for each of multiple of the range bins.

According to another aspect of the invention, a method of processing reflected radar signals includes the steps of: creating a range-Doppler map from the reflected signals; and separately determining contours a mainlobe clutter region for each of multiple of range bins of the range-Doppler map. The determining includes applying both at least one linear operation and at least one non-linear operation to data of the range-Doppler map.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A method of adaptively removing mainlobe clutter from range-Doppler data includes estimating the peak of the mainlobe clutter, and determining clutter region boundaries adaptively and robustly. The mainlobe clutter peak may be estimated from the range-Doppler data, for example using both nonlinear and linear filters. Alternatively the mainlobe clutter peak may be estimated from knowledge of the position and speed of the vehicle, such as a missile, upon which the radar system moves. The clutter boundaries may be determined at each of the range bins by stepping along Doppler bins from the mainlobe clutter peak estimate in opposite directions, locating the boundary at locations off of the mainlobe clutter peak estimate that meet a given criterion. One criterion involves two consecutive Doppler bins having signal strength (power) below a threshold value. The threshold may either be a predetermined threshold value, or an adaptive threshold based on the general noise level of the range-Doppler data. Results from this process can be further smoothed or refined by filtering. The method produces a finer determination of the mainlobe clutter region, resulting in less of the range-Doppler data being excluded as part of the mainlobe clutter region. This means that more data is analyzed for presence of moving objects such as targets. Use of the described mainlobe clutter determination method requires little computing power, and may be performed by even simple integrated circuit chips.

Figure 1:
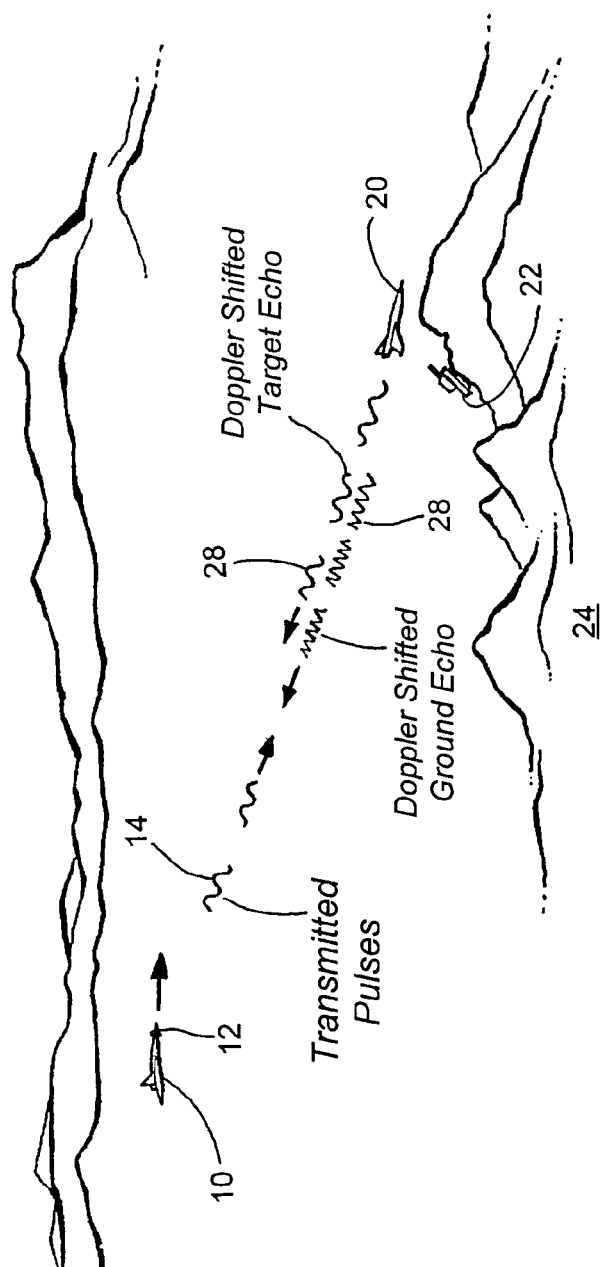
FIG. 1 is a schematic diagram illustrating operation of a radar system using a method in accordance with an embodiment of the present invention.

FIG. 1 shows a radar system 10 on a moving platform 12, such as a missile or other aircraft. The radar system 10 sends out signals (pulses) 14 in search of moving targets, for example relatively fast-moving airborne targets such as an aircraft 20 and/or relatively slow-moving ground targets such as a vehicle 22, located on a ground surface 24. The targets 20 and/or 22 reflect the outgoing signals 14, creating reflected signals (pulses) 28 that return to the radar system 10. The ground surface 24 also reflects the outgoing pulses 14, creating return pulses 30 sent back to radar system 10 as ground clutter.

The radar system 10 may be a tri-mode system. Detection may be performed with a variation of a Neyman-Pearson detector.

Figure 2:
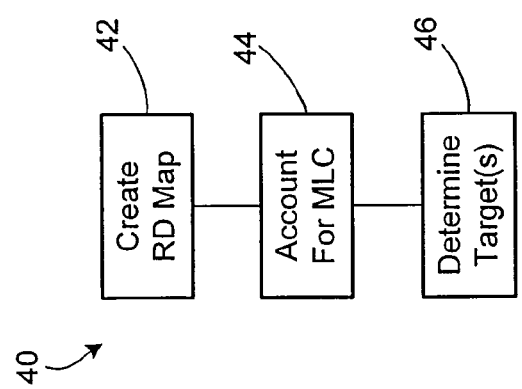
FIG. 2 is a high-level flow chart of a method that includes the method in accordance with an embodiment of the present invention.

Referring now to FIG. 2, a broad overview is shown of a method 40 of processing the reflected signals (pulses) 28 (FIG. 1) that are received by the radar system 10. In step 42 a range-Doppler (RD) map is created from the received pulses 28. The term "range-Doppler map" is used herein to refer broadly to processed reflected signal data, divided by range bins and Doppler bins. Doppler bins corresponding to ranges of velocity, divided up into bins by ranges of frequency. The resulting divisions may be termed Doppler bins, velocity bins, or frequency bins.

The time from when a given outgoing pulse 14 is sent, and when a corresponding return pulse 28 is received, can be used to determine the range between the radar system 10 and the reflecting object, whether that object is a target 20 or 22, or the ground surface 24. The timing of the returned reflections may be sorted into multiple range bins, wherein each of the range bins covers an interval of return time, corresponding to an interval of range.

Figure 3:
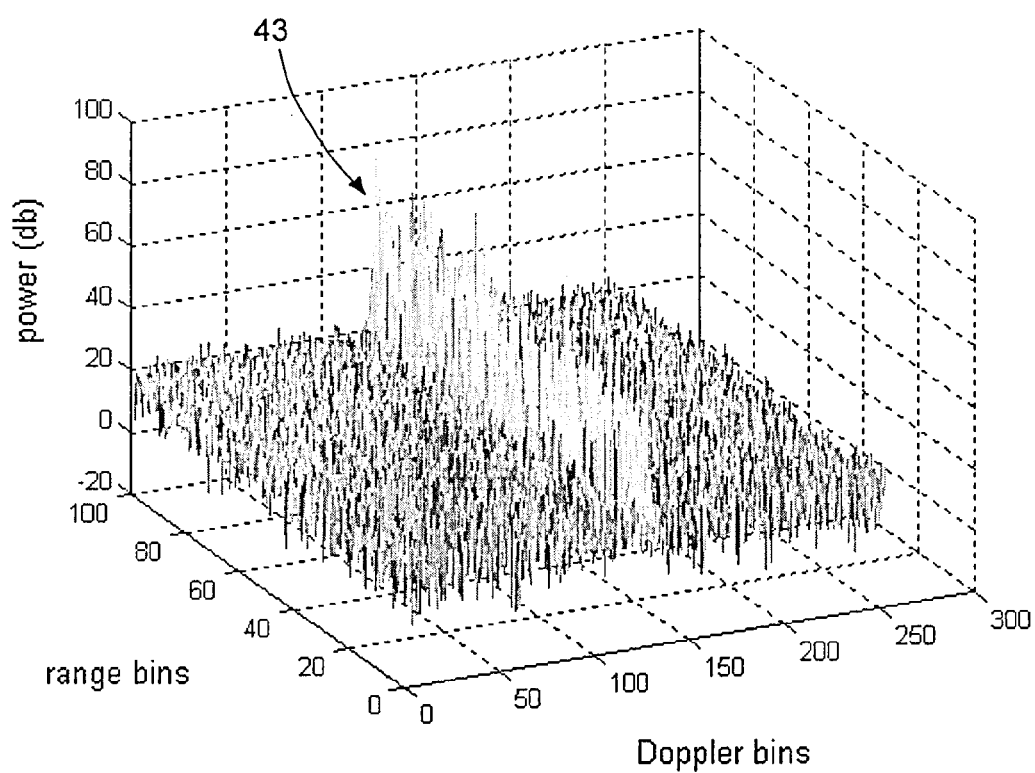
FIG. 3 is a graph showing sample range-Doppler data of a radar system.

In organizing the incoming reflected signals (pulses) 28 into a range-Doppler map the signal strength (power) may be aggregated over multiple combinations of range bin and Doppler bin. This produces a range-Doppler map, which is representable as a two-dimensional matrix of range bin vs. Doppler bin, with a signal strength (power) for each of the combinations of range bin and Doppler bin. Such a representation is shown in FIG. 3. It will be appreciated that the term range-Doppler map is to be construed broadly, and is not limited to any particular way of storing or representing data corresponding to pairs of range (time) bins and Doppler (velocity, frequency, or wavelength) bins.

RD maps are the intermediate signal processing result of air-to-ground radar illumination and reception of an area of interest. After signal processing, the received radar waveform including motion compensation, pulse compression, intermediate frequency (IF) frequency shift, analog-to-digital conversion, coherent range compression, coherent Doppler compression, and optionally incoherent integration and data whitening, the result is a real-valued matrix of radar resolution cells. This matrix, known as an RD map, contains the range and Doppler measurements of the radar-illuminated scene. An example RD map is shown in FIG. 3, with a mainlobe clutter ridge 43 represented as a peak level running across the RD map. The processes used in creating RD maps are well known, and are not discussed further herein.

After the creation of the RD map, in step 44 the RD map is processed to account for mainlobe clutter (MLC), the ground clutter associated with the main, or most important lobe of operation, of the antenna of the radar system 10 (FIG. 1). The focus below is on certain embodiments that involve processing the RD map to account for the mainlobe clutter.

After the RD map processing, target determination may be made in step 46. Power (magnitude squared) in a test cell (given combination of range bin and Doppler bin) is compared to the scaled power in a reference cell or group of reference cells. If the resulting ratio exceeds a predetermined threshold, a detection has occurred and a target like object (TLO) is declared.

Figure 4:
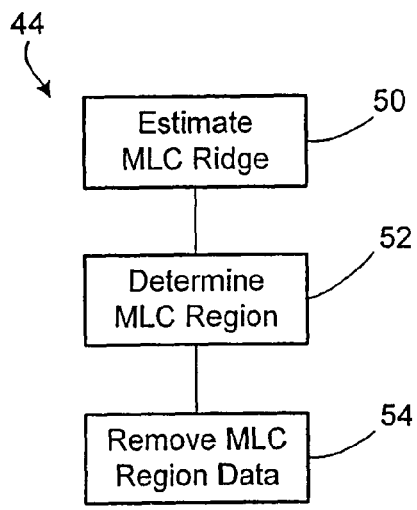
FIG. 4 is a high-level flow chart show more detail of a portion of the method of FIG. 2.

FIG. 4 shows a high-level flow chart of one embodiment of the RD map processing 44. In step 50 the location of the MLC ridge on the RD map is estimated. In step 52 the contours of the MLC ridge or region are determined. Finally, in step 54, data within the MLC region contours or boundaries is removed from further processing. The removal in step 54 does not necessarily involve any manipulation of data, but rather may just involve looking for targets in regions of the RD map that are outside of the MLC ridge contours (avoiding the region within the MLC ridge contours). Such an approach results in an inability to find targets that might be located on the RD map inside the MLC ridge contours. This is accepted as a tradeoff for avoiding the significant processing that would be required to be able to compensate for MLC while still being able to find targets near the MLC ridge. One goal of the methods described herein is to determine the MLC ridge contours in such a way to as to minimize the area of the RD map where targets will not be detected, while still avoiding mainlobe clutter being mistaken for targets.

Figure 5:
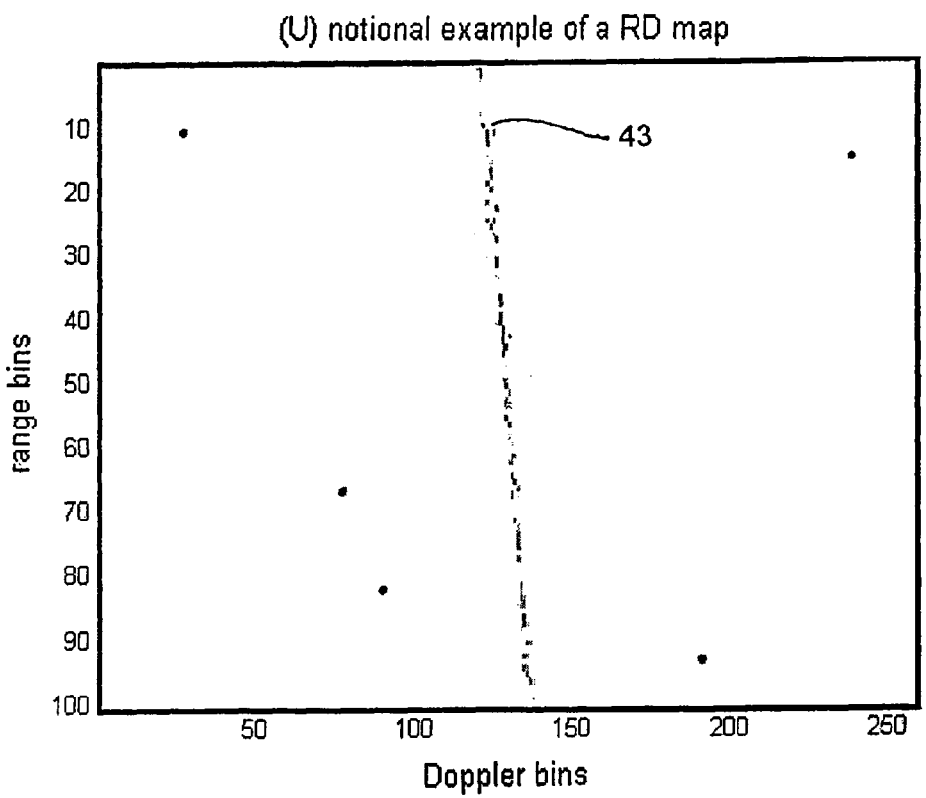
FIG. 5 is a graph showing the data of FIG. 3, represented as a two-dimensional range-Doppler map.

In performing the MLC ridge location estimation in step 52, linear and non-linear steps may be performed to provide an estimate from the data of the RD map. FIG. 5 shows another representation of the RD map also shown in FIG. 3. The MLC ridge 43 is shown in the RD map of FIG. 5 as a series of peak values (points or dots on the RD map) that is approximately linear.

Figure 6:
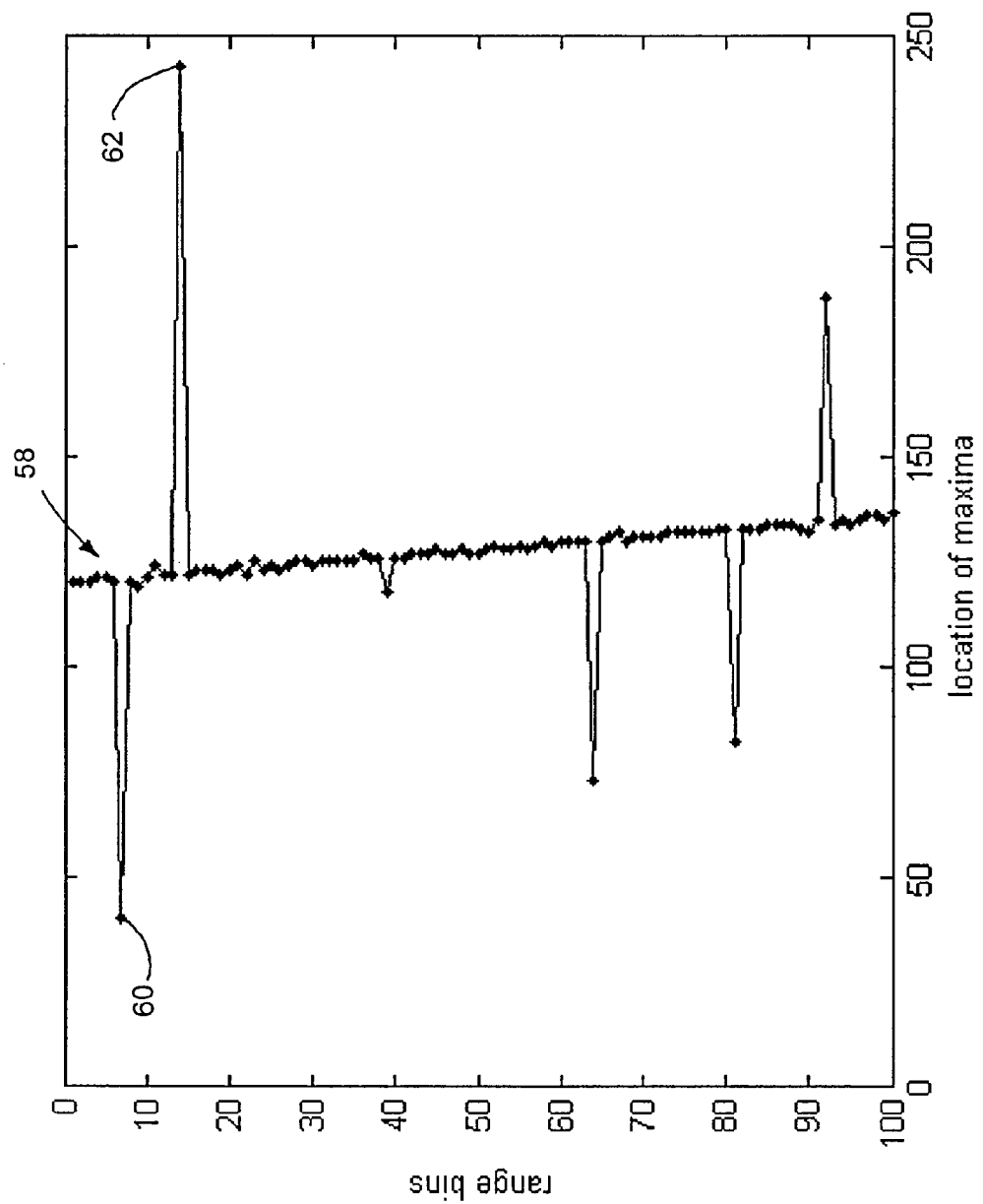
FIG. 6 is a graph illustrating one step in the process of adaptive mainlobe clutter removal according to an embodiment of the invention.

FIG. 6 shows a line connecting the Doppler bins having the maximum signals (peak power) for each of the range bins. The result is a jagged line 58, with most of the peaks on the MLC ridge 43. The jagged nature of the points at or near the MLC ridge 43 is due to the stochastic nature of the MLC. Some of the peaks, such as data points 60 and 62, are at locations well away from the MLC ridge 43. These outlying points are likely results indicating targets, and any method of estimating the location of the MLC ridge 43 should exclude them.

Figure 7:
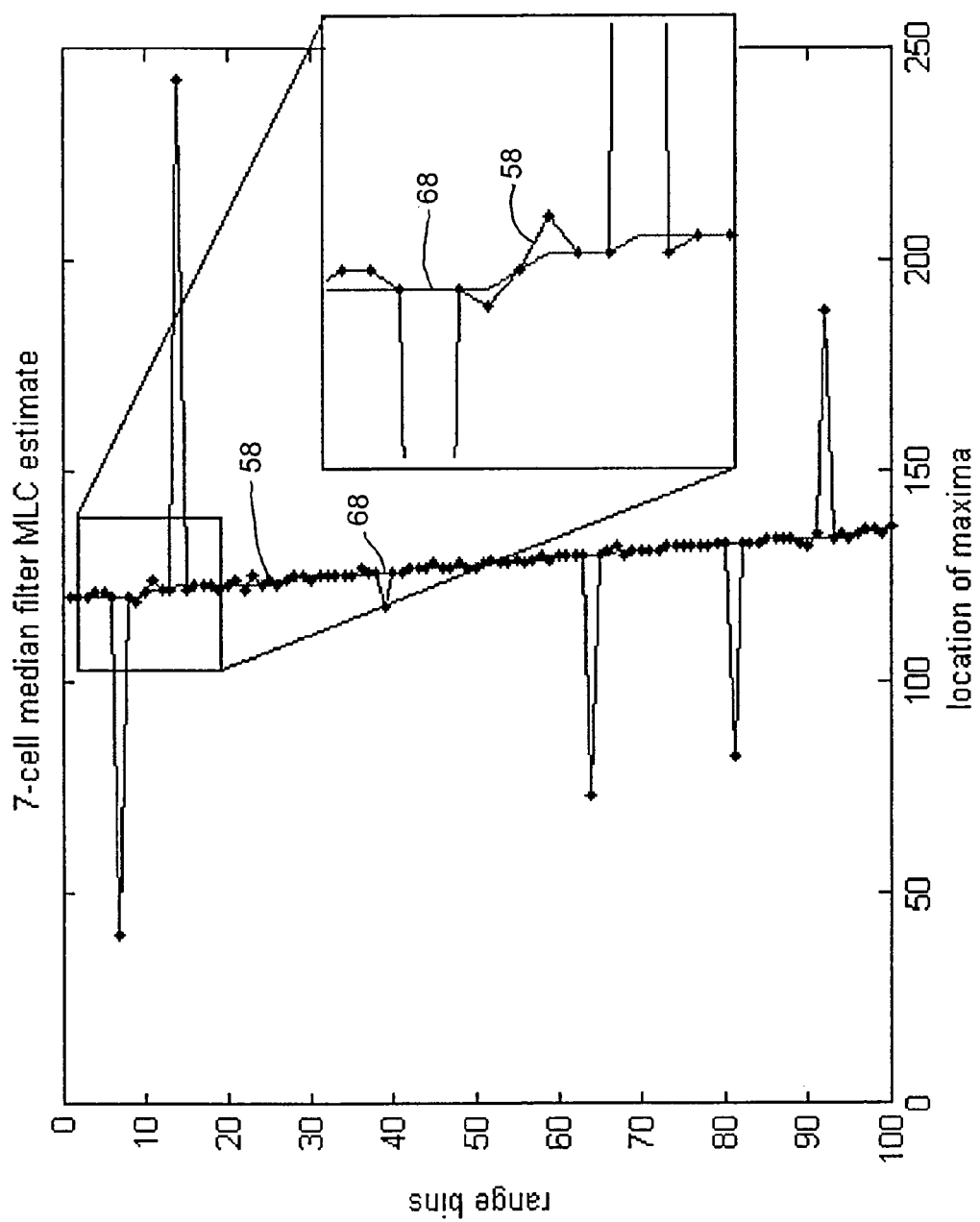
FIG. 7 illustrates another step in the process of adaptive mainlobe clutter removal according to an embodiment of the invention.

FIG. 7 illustrates one way of processing the peak data of FIG. 6 to exclude the outliers and focus on the peaks that are part of the MLC ridge 43. The processing represented in FIG. 7 is a non-linear processing, applying a median filter to the peaks on the jagged line 58. The median filter has a width of W cells, where W is an integer preferably from 3 to 11. For example, a 7-cell median filter may be applied to the peak data.

The median filtering is applied for each of the rows (range bins), except for the first few and last few rows (where there are not enough cells (rows) on either side to properly perform the median filtering). A median is taken of the Doppler bins corresponding to peak values for the W/2 cells (range bins) on either side of a given cell (range bin). For example, a 7-cell median filter involves examining the Doppler bins for the peaks for a given range bin, as well as the three preceding and three following range bins. The median Doppler bin value of those seven values is assigned as the filtered value for that range bin. The result is filtered value line 68 shown in FIG. 7. The filtered line (median filter estimate) 68 is located along the MLC ridge 43, but avoids outlying values, such as the points 60 and 62. The median filter estimate 68 skips over these large deviations, as it is robust to them. A seven-cell median filter is robust to at most three adjacent same-sign outliers or four scattered different-sign outliers.

Figure 8:
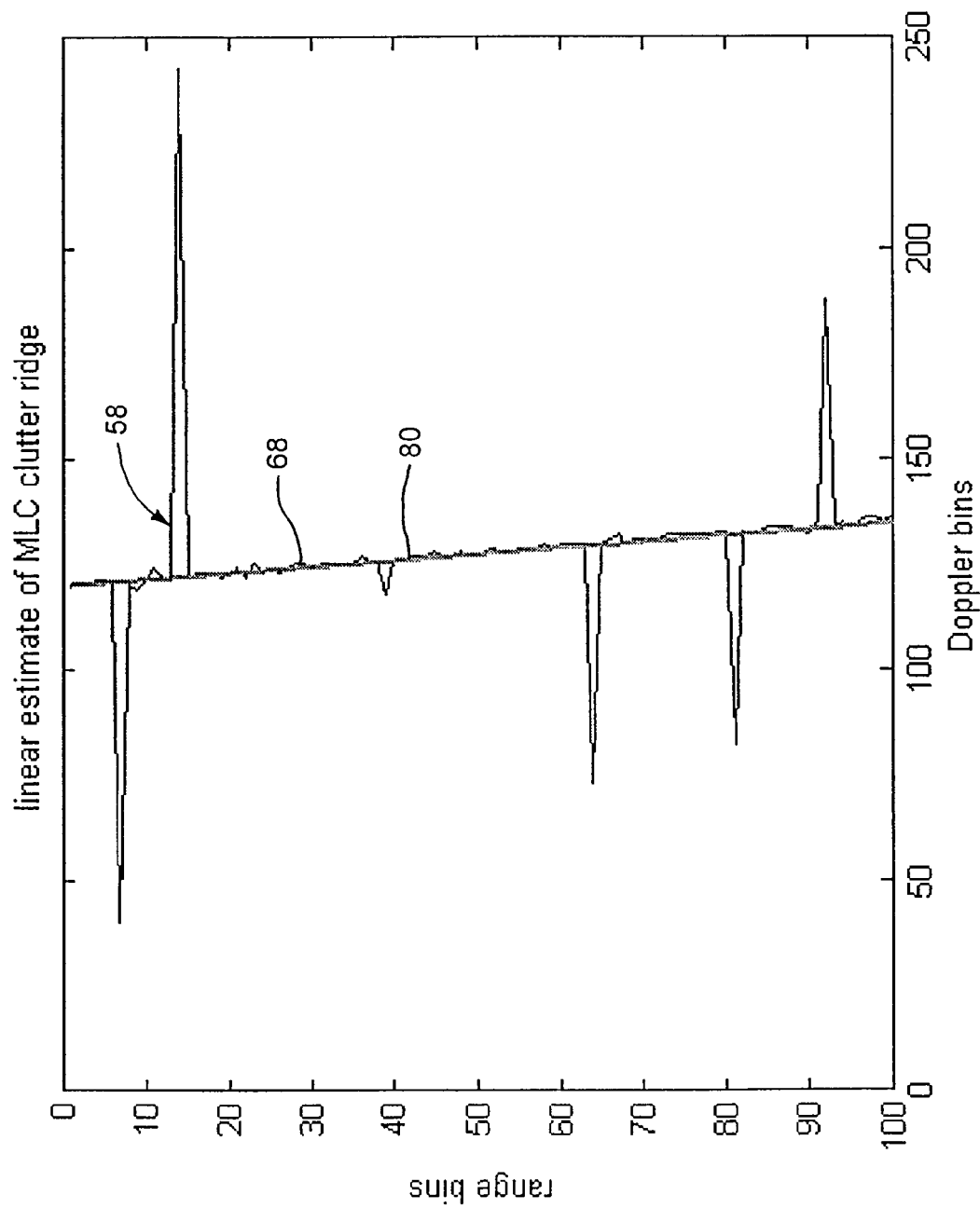
FIG. 8 illustrates still another step in the process of adaptive mainlobe clutter removal according to an embodiment of the invention.

With reference now to FIG. 8, the MLC ridge 43 is next estimated using a linear fit applied to the median filer estimate

68 (FIG. 7). The fit may be a standard least-squares or mean-square fit, for example providing a linear fit that minimizes the mean square error between a linear MLC ridge estimate 80 and the points of the median filter estimate 68. The resulting linear estimate 80 may be extrapolated to the range bins beyond the limits of the median filter MLC ridge estimate 68.

The linear fit shown in FIG. 8 presupposes a relatively benign flight profile and limited azimuth deviations from the radar platform's instantaneous velocity. If such conditions do not hold, then the linear fit described above can be replaced with a cubic MLC ridge estimate.

The linear (or cubic) fit resulting from the process of FIG. 8 produces an accurate and robust result. It is accurate in that it closely matches the location of the MLC ridge 43. It is robust in that it avoids following the outlying data points.

As an alternative to the above process for estimating the MLC ridge 43, an MLC ridge estimate may be made more directly using information on a flight profile of the antenna platform and an orientation of the antenna. Using a system on the platform such as a global positioning system (GPS), the instantaneous location of the platform can be determined to a high degree of accuracy. With the orientation of the antenna (e.g., in a given direction pointed toward the ground) also known, the location of the MLC ridge 43 on the range-Doppler map can be estimated. Such an estimate may be used in place of the linear MLC ridge estimate 80 obtained using the above steps. In making such an estimate the following inputs may be utilized: 1) the platform's onboard navigation-reported position and velocity, OR the platform's pre-planned position and pre-planned velocity; 2) the ground aim-point of the radar beam; 3) the nominal (measured or calculated) two-way antenna (directivity) pattern; and 4) the minimum and maximum ranges corresponding of the associated (desired) range-Doppler (RD) map. These inputs may be used to determine (calculate) the Doppler bin which will possess the largest return power assuming the illuminated ground patch is of constant reflectivity for each range bin in the RD map. This can be done by projecting the antenna pattern from the platform to the ground, determining the angular location of the largest power return point (for each range bin), and then determining the Doppler shift of the associated angular location and finally determining Doppler bin corresponding to that shift. Both platform elevation and beam squint angle (the angle between the platform's velocity vector and the vector from the platform's position and the ground aim-point) will affect the results of the calculation. However, the calculation, based on the inputs is deterministic and so can be performed without the need for actual measurements, when the pre-planned position and pre-planned velocity are used.

The MLC ridge estimate 80 (or any of the alternatives described above) may be used as a starting point for determining the contours of the boundaries of the MLC region. One method determining the contours starts with, for each of the range bins, beginning at the Doppler bin where the MLC ridge estimate is located (for that range bin), and stepping Doppler bin by Doppler bin away from the MLC ridge estimate, until a contour boundary condition is satisfied (met). One possible contour boundary condition is for a Doppler bin in question to have a power above a certain threshold, while the next two (or more) Doppler bins further away from the MLC ridge estimate have power (signal strength) below that the threshold. This provides a "look ahead" buffer of two (or more) Doppler bins between the edge (boundary) of the MLC region any potential low Doppler-index targets which might be arbitrarily close to the edge of the MLC region. The two-Doppler bin gap has been shown to be satisfactory in at least some environments. However the number of look-ahead bins that must be below the threshold may be increased if desired, such as for a more robust clutter boundary estimation.

Figure 9:
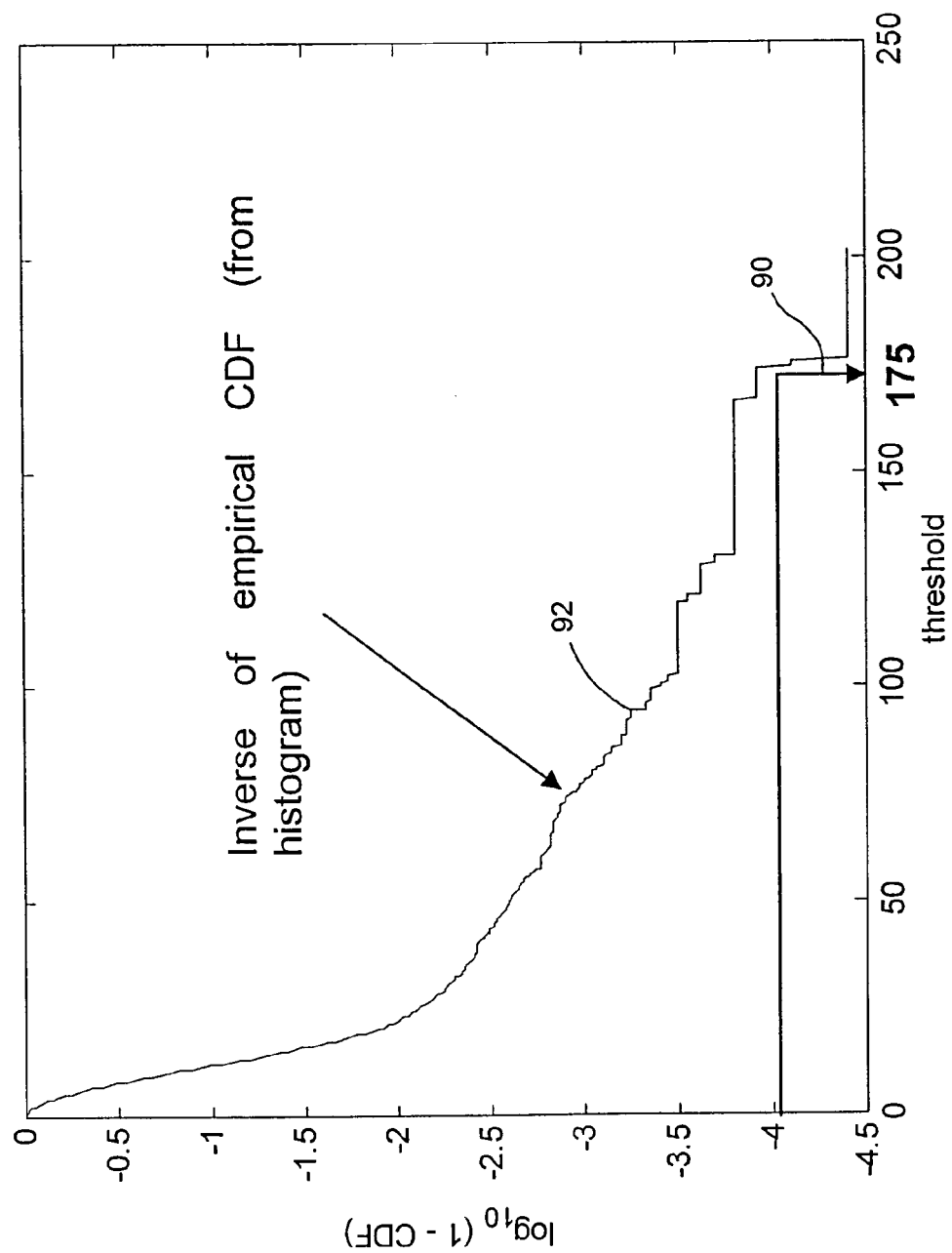
FIG. 9 illustrates threshold determination in the process of adaptive mainlobe clutter removal according to an embodiment of the invention.

It will be appreciated any of a wide variety of thresholds may be utilized in the process of determining the boundaries of the MLC region. As one example, the threshold level may be the inverse cumulative distribution of the underlying thermal noise power evaluated at the application false alarm probability (nominally $10^{-4}$). Alternatively the empirical probability distribution of the underlying thermal noise can be extracted from (for example) Doppler bins well away from the MLC, and across all range bins. In such a technique a value such as the 95th percentile of the resulting empirical probability density function can be used as a threshold. FIG. 9 illustrates the latter technique using various inverse cumulative distribution function threshold choices, for instance a threshold choice 90 along an inverse cumulative distribution function 92.

The threshold may be adaptive, in that it is pegged to the level of the of the background noise. The threshold level may be set to same percentage of some function of the actual noise level (level of signals away from the MLC, excluding target signals, for example using filtering), with the threshold level updated periodically or substantially continually. Such adaptive threshold determination may be desirable in environments where the radar system is subject to high levels of external noise, or to variable levels of external noise. It will be appreciated that preset and adaptive threshold levels may be combined, for example by using adaptive threshold determination, combined with a "floor" of minimum threshold level.

The results from the contour boundary condition satisfaction can be processed further, for example by using an N-element trimmed maximum (or minimum) filter. For example, the result for each range bin may be processed by use of a five-element filter. In filtering the right boundary location, the right contour boundary location (Doppler bin) for that range bin, along with the right boundary locations (Doppler bins) for the two proceeding and two succeeding range bins. The fourth largest right boundary Doppler bin location is taken as the result of the filtering, and is used as the new right contour boundary location for the range bin in question. Discarding the largest value (rightmost boundary of the five) allows for unusual statistical outliers to be ignored, while allowing adjacent MLC right boundary estimates to bias the estimate further away from the clutter ridge. A similar procedure may be used for the left boundary, except that the four smallest value (fourth-furthest-leftward Doppler bin location of the five) may be used as the result of the five-element filter. This is a mirror image of the filtering provided for the right boundary of the MLC region. It will be appreciated that the five-element trimmed maximum (or minimum) filter may be replaced by any N-element (N>5) trimmed filter, as desired. By rejecting the maximum (or minimum) values, slightly less conservative (but robust) values are obtained.

It will be appreciated that still further processing may be done regarding the locations of the boundaries of the MLC region. For example, a linear or cubic fit may apply to the above results, either to the filtered or unfiltered results.

Another possibility would be to impose a hard limit on the amount of allowable deviation of the MLC boundaries from the MLC ridge. Such a hard limit avoids large deviations, for example in a situation where multiple target detections near the MLC boundary can adversely bias the boundary estimate. The hard limit may depend upon the types of targets for which the radar system is designed. To give one example, based upon the physics of radar illumination and scattering, a maximum boundary deviation from the MLC ridge may be set at one half of the radar beam's null-to-null spacing. This provides a conservative upper limit for boundary location deviations from the MLC ridge.

Figure 10:
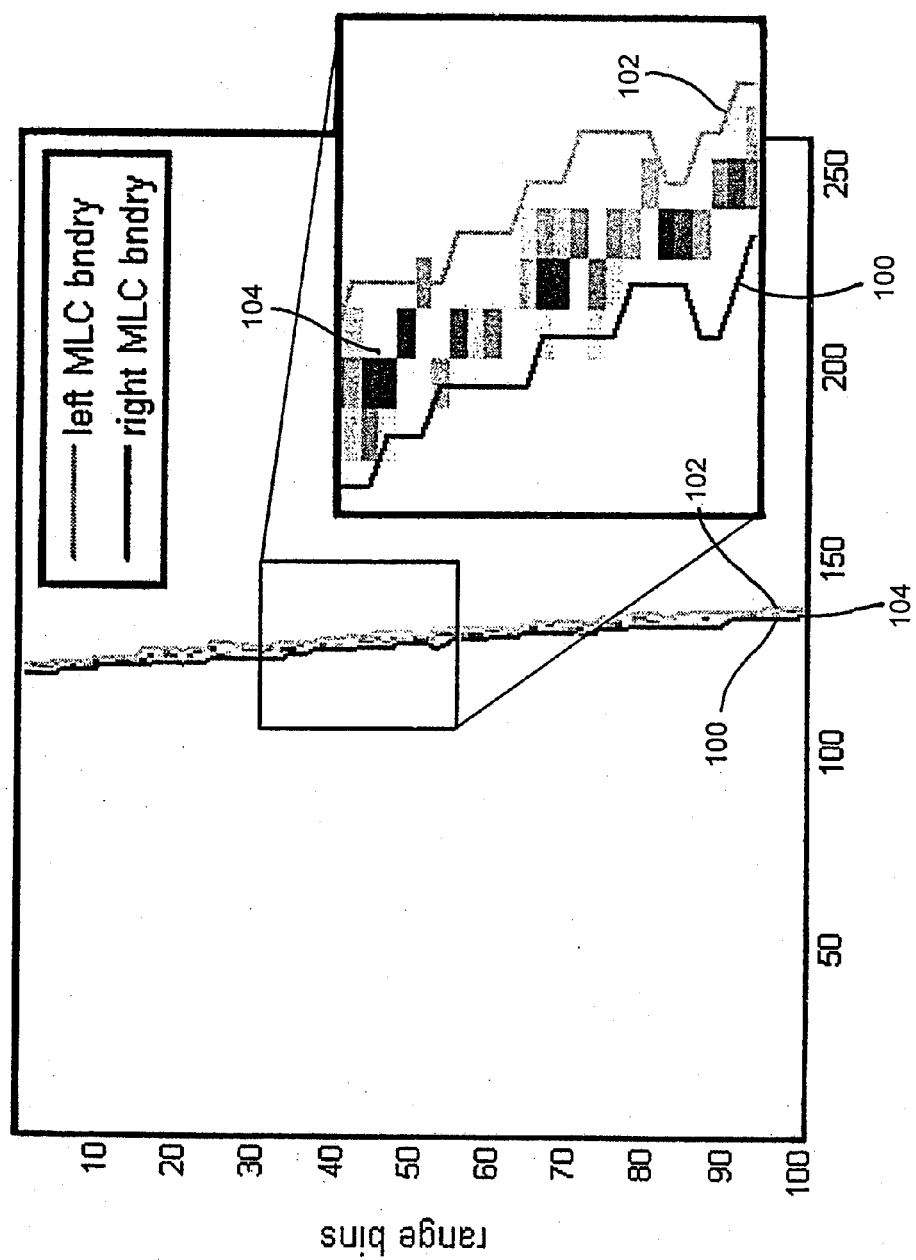
FIG. 10 illustrates a further step in the process of adaptive mainlobe clutter removal according to an embodiment of the invention.

It will be appreciated that the above (sub)processes may combined or omitted in various suitable ways in one or more processes for determining the boundary of the MLC region. It will be further appreciated that boundary estimates for the MLC region may be extrapolated across range bins that were not successfully estimated. FIG. 10 shows a sample result for the left and right boundaries 100 and 102 of a MLC region 104.

After the determination of the contours of the MLC region, the data in the remaining regions of the RD map may be examined to locate and identify targets. The data processing for target determination in non-MLC-region parts of the RD map is well known, and is not described further here.

It will be appreciated that the processes described herein may be embodiment in any of variety of ways, for example being in software, hardware, or a combination of the two.

The methods and processes described herein may be advantageously employed in radar systems of missiles, for example in radar systems searching for ground targets. The methods have the advantage of requiring a relatively small amount of computing power, which can be an advantage in missiles, which often are unable to include the greater computer power that may be found on larger platforms, such as airplanes. However, it will be appreciated that the methods/processes may also be incorporated into larger radar platforms, if desired.

The methods described herein also have the advantage of removing from consideration only a limited region around the MLC ridge. This still leaves open almost all of the RD map for detecting targets. The method is adaptive, with MLC region boundaries that that are sloped on the RD map, with a slope corresponding to a slope of the MLC ridge estimate (from whatever source).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of processing reflected radar signals, the method comprising:
    creating a range-Doppler map from the reflected signals;
    making a mainlobe clutter ridge estimation from the range-Doppler map; and
    separately determining boundaries of a mainlobe clutter region around the mainlobe clutter ridge estimation, for each of multiple of the range bins;
    wherein the determining includes applying one of at least one linear operation and at least one non-linear operation to data of the range-Doppler map.

2. The method of claim 1, wherein the making the mainlobe clutter ridge estimation includes making a linear mainlobe clutter ridge estimation.

3. The method of claim 1, further comprising target determining using substantially all parts of the range-Doppler map except the mainlobe clutter region.

4. A method of processing reflected radar signals, the method comprising:
    creating a range-Doppler map from the reflected signals;
    making a mainlobe clutter ridge estimation from the range-Doppler map; and
    separately determining boundaries of a mainlobe clutter region around the mainlobe clutter ridge estimation, for each of multiple of the range bins;
    wherein the making includes:
        determining a Doppler bin peak for each of the multiple range bins; and
        applying non-linear filtering to the Doppler bin peaks to produce filtered peak data.

5. The method of claim 4, wherein the applying includes applying a median filter to the Doppler bin peaks.

6. The method of claim 4, wherein the making includes using the filtered peak data as the mainlobe clutter ridge estimation.

7. The method of claim 4, wherein the making includes making a linear mainlobe clutter ridge estimation from the filtered peak data.

8. A method of processing reflected radar signals, the method comprising:
    creating a range-Doppler map from the reflected signals;
    making a mainlobe clutter ridge estimation from the range-Doppler map; and
    separately determining boundaries of a mainlobe clutter region around the mainlobe clutter ridge estimation, for each of multiple of the range bins;
    wherein the making includes making a linear mainlobe clutter estimation as a function of speed and altitude of a platform that includes a radar system that receives the reflected signals.

9. A method of processing reflected radar signals, the method comprising:
    creating a range-Doppler map from the reflected signals;
    making a mainlobe clutter ridge estimation from the range-Doppler map; and
    separately determining boundaries of a mainlobe clutter region around the mainlobe clutter ridge estimation, for each of multiple of the range bins;
    wherein the determining the boundaries includes, for each of the range bins, starting at the Doppler bin corresponding to the mainlobe clutter ridge estimation, and moving away from the Doppler bin corresponding to the mainlobe clutter ridge estimation, Doppler bin by Doppler bin, until a contour boundary condition is satisfied.

10. The method of claim 9, wherein the contour boundary condition includes a power at a boundary Doppler bin above a threshold level, while the power at the next at least two Doppler bins further away from the mainlobe clutter ridge estimation is below the threshold level.

11. The method of claim 10, wherein the threshold level is a predetermined threshold level.

12. The method of claim 10, wherein the threshold level is an adaptive threshold determined from data of the range-Doppler map.

13. The method of claim 9, further comprising filtering the result of the determining of the boundaries, wherein the filtering the result includes filtering the results of multiple range bins.

14. A method of processing reflected radar signals, the method comprising:

creating a range-Doppler map from the reflected signals; and separately determining contours a mainlobe clutter region for each of multiple of range bins of the range-Doppler map;

wherein the determining includes applying both at least one linear operation and at least one non-linear operation to data of the range-Doppler map.

15. The method of claim 14, wherein the determining includes applying a linear fit to make a mainlobe clutter ridge estimation.

16. The method of claim 14, wherein the determining include filtering using a non-linear filter.

17. The method of claim 14, further comprising target determining using substantially all parts of the range-Doppler map except the mainlobe clutter region.

* * * * *